Nov. 29, 1955   J. N. RIMKUS   2,725,248
TRUNK LATCH OPERATOR

Filed Aug. 11, 1952   2 Sheets-Sheet 1

INVENTOR.
JOSEPH N. RIMKUS
BY
ATTORNEY

Nov. 29, 1955  J. N. RIMKUS  2,725,248
TRUNK LATCH OPERATOR
Filed Aug. 11, 1952  2 Sheets—Sheet 2
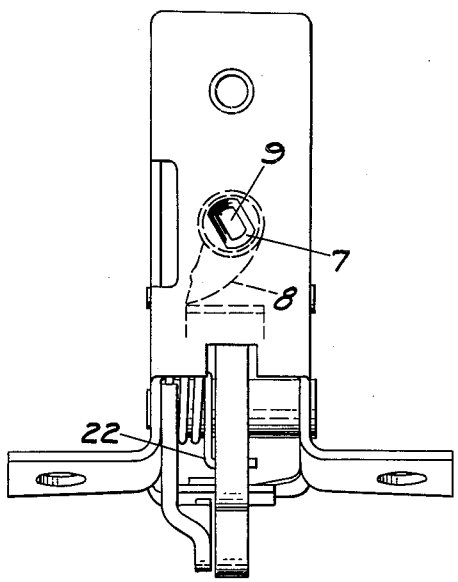
Fig. 3
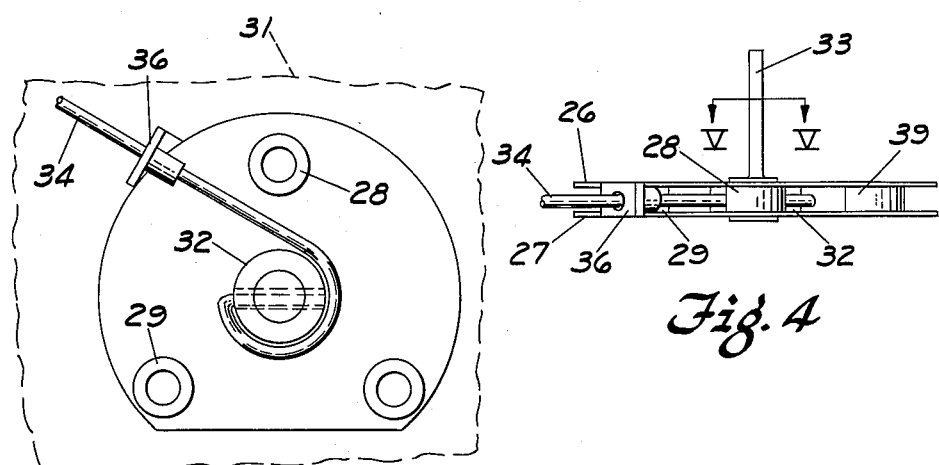
Fig. 5
Fig. 4
Fig. 6
INVENTOR.
JOSEPH N. RIMKUS
BY
ATTORNEY UnitedStates Patent Office 2,725,248
Patented Nov. 29, 1955

2,725,248
TRUNK LATCH OPERATOR
Joseph N. Rimkus, Paw Paw, Mich.
Application August 11, 1952, Serial No. 303,759
1 Claim. (Cl. 292—125)

This invention relates to an operating device for the trunk latch of a passenger automobile, and relates particularly to a device of such nature which is capable of operation from a selected point within the passenger compartment of such automobile.

The inconvenience and nuisance of the common provision of a separate lock for the trunk of an automobile has long been well recognized. It is particularly inconvenient in view of the frequency with which it is necessary to open the trunks for checking the inflation of a spare tire, which for a number of years it has been customary to carry within such trunks, for this necessitates the operator of the vehicle leaving his position in the front seat and going to the rear of the car.

Further, the use of independent locks on the trunk of the automobile renders it possible for such locks to be picked or forced and such trunks be thereby improperly opened. This could be cured by effectively locking and opening of the trunk by means operable wholly from within the car.

Accordingly, it is a primary object of the invention to provide a device for locking and unlocking the trunk of a conventional passenger automobile which means are wholly within the automobile and operable from a selected point within the passenger compartment.

A further object of the invention is to provide such a device which will utilize presently standard parts to a high degree.

A further object of the invention is to provide means, as aforesaid, which will be relatively simple and which will be unlikely to get out of order.

A further object of the invention is to provide means, as aforesaid, which will be easy to operate.

Other objects and purposes of the invention will be apparent to persons acquainted with equipment of this general type upon a reading of the following disclosure and inspection of the accompanying drawings.

In the drawings:

Figure 3 is a front view of a conventional trunk latch with the operator removed therefrom.

Figure 4 is a top view of the trunk latch operator.

Figure 5 is a section taken on the line V—V of Figure 4.

Figure 6 is a front view of the operator with the front plate thereof removed to reveal the parts.

In providing a device meeting the purposes aforesaid, I have provided a mechanism fitting into the portion of the latch mechanism normally occupied by the trunk lock and have associated said member with a cable operated drum for rotating same to open said latch. Said cable may in any conventional manner be carried into any desired portion of the compartment of the automobile, as adjacent the driver's position.

While the broad idea embodied in the present invention may be carried out in a variety of makes of cars, the specific embodiment here utilized for illustrative purposes has been taken from a Buick automobile and the following description, for illustrative purposes, will proceed on the basis of such embodiment.

Figure 1:
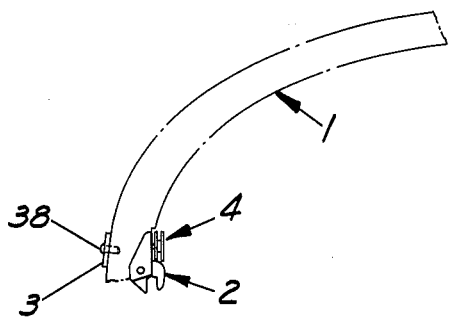
Figure 1 is a semi-schematic view of a trunk latch and operator in its operating position on the lid of the trunk of the passenger automobile.

Referring to Figure 1, there is schematically shown the cover 1 for a conventional passenger automobile trunk having latch mechanism 2, a plate 3 covering the opening from which the lock mechanism has been removed and the latch operator 4.

Figure 2:
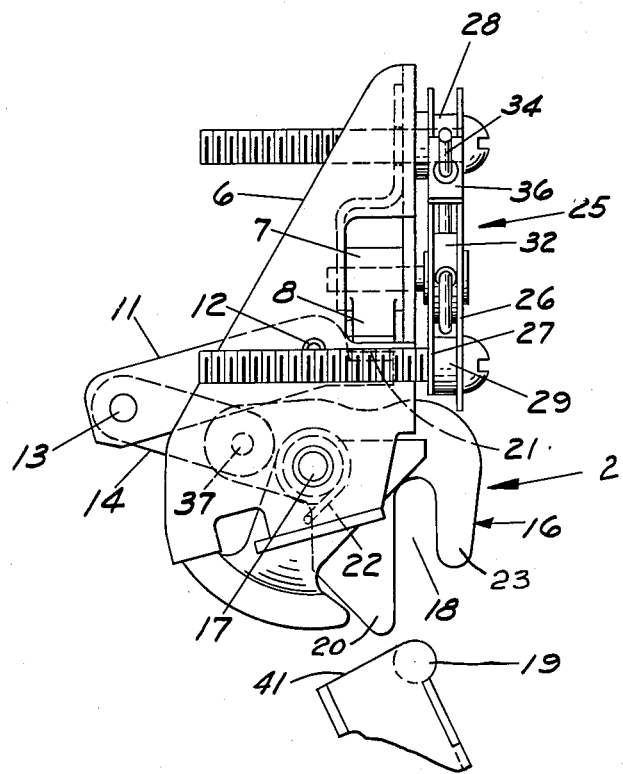
Figure 2 is a side view of the trunk latch and operator in operative position with relation thereto.

Referring next to Figures 2 and 3, the latch and latch mechanism are shown in more detail. Although the present invention does not involve the latch mechanism as such, the latch mechanism here used for illustrative purposes will be hereinafter briefly described for purposes of complete clarity.

A frame 6 rotatably supports a barrel 7 having depending therefrom a cam 8, as shown in Figures 2 and 3 and so arranged that upward pressure thereon will rotate the barrel 7 in a clockwise direction and that rotation of said barrel 7 in a counterclockwise direction will effect downward movement of said cam. Said barrel has a slot 9 extending therethrough which in present practice receives an operating bar from the conventional lock structure. Rotation of the key in said lock effects rotation of said bar about its longitudinal axis and this in turn effects rotation of the barrel 7 and of the cam 8. A first link 11 is pivotally fastened at 12 to said frame, contacts the lower surface of the cam 8 by its rightward end 21, and pivotally supports at 13 a second link 14. The latch structure 16 is pivotally mounted at 17 to said frame 6 and has the opening 18 which functions to receive the bar 19 which is fastened to the frame of the automobile and which when engaged holds the trunk in closed position. Said latch 16 is pivotally engaged at 37 by the second link 14. A spring 22 urges the latch to rotate in a counterclockwise direction as viewed in Figure 2 whenever said latch is free to rotate. It will be understood that when the barrel 7 rotates in a counterclockwise direction as appearing in Figure 3, the cam 8 will bear against the rightward end 21 of the lever 11, move the leftward end thereof upwardly and effect a counterclockwise rotation of the latch 16 in response first to the urging of the link 14 and, second, to the urging of the spring 22.

The latch operator of the invention comprises a pair of parallel plates 26 and 27 which are held in parallel spaced relation by the spacers 28, 29 and 39. Suitable bolts extend through these spacers for connection to and with the frame 6 and to and with frame members of the door 1, such as the frame member 31 indicated generally in Figure 6. A rotatable drum 32 is pivotally positioned between the plates 26 and 27 and is affixed to a projecting member 33 of rectangular cross section, as appearing in Figure 5, said cross section being of such size and shape as to fit into the slot 9, shown in Figure 3. A cable 34 is wrapped around said drum 32, as appearing in Figure 6 and extends through the guide 36.

Thus, to convert any conventional trunk door, as those provided on Buicks or any other cars made by General Motors Corporation, from a lock construction to the construction of the present invention, requires only the following:

1. Removal of the lock structure now conventionally provided,
2. Closing of the lock opening by the plate 3 which may be of any conventional construction, such as a simple plate held in place by self-tapping metal screws 38, and
3. Mounting of the operator mechanism 25 as described with the projecting member 33 being received into the presently existing slot 9 of the barrel 7.

The cable 34 may be conducted to the forward end of the car in any conventional manner, such as by being led through the top structure with a suitable pulling arrangement for said cable being provided at a selected position within the passenger compartment, such as adjacent the driver's seat.

The operation will be evident from the description foregoing, but will be outlined in the interest of completeness.

In closing the trunk door, beginning with the latch 16 in the position shown in Figure 2, and with the cable 34 partially wrapped around the drum 32, the door is merely closed in the usual manner and the guide 20 acts against the surface 41 to rotate the latch 16 in a clockwise direction and the hook 23 will move around the bar 19, as in present practice, and the trunk will be locked in closed position. This moves the link 14 rightwardly, the lever 11 counterclockwise and its rightward end upwardly. This acts against the cam 8 and the barrel 7 to rotate the drum 32 in a clockwise direction, as seen in Figure 6, and further draw the cable around the drum.

When it is desired to open said trunk, the cable 34 will be pulled leftwardly, as appearing in Figure 6, and the reel 32 will be caused to rotate in a counterclockwise direction, as appearing in Figure 6. This will cause a similar rotation of the projecting member 33 and thereby cause a counterclockwise rotation of the barrel 7 and of the cam 8 (Figure 3). This will depress the part 21 of the link 11 and thereby raise the pivot point 13. This will move the link 14 sufficiently to enable the spring 22 to rotate the latch 16 in a counterclockwise direction as appearing in Figure 2 and thereby to effect a release of the member 19, whereupon the trunk may be opened in the usual manner.

Accordingly, I have provided a device which may be readily designed to fit a wide variety of automobiles and which may be quickly attached to present locking structures. By this device the objects and purposes above outlined may be readily and effectively accomplished.

While in the foregoing description I have utilized a particular style of device to illustrate the invention, it can be readily recognized that the objects and purposes thereof may be accomplished by devices having a variety of specific variations from the device above illustrated and described and that all of such devices will be included within the scope of the hereinafter appended claim excepting as said claim may by its own terms specifically require otherwise.

I claim:

In a latch operating mechanism adapted for application to the trunk cover of a passenger automobile, said cover being provided with a latch mechanism including a rotatable barrel, and means whereby rotation of said barrel effects release of said latch mechanism, and said barrel having an axially positioned slot therein of non-circular cross-section, said operating mechanism comprising: a pair of spaced plates; a plurality of spacers interposed between said plates to hold them in a preselected position with respect to each other; a plurality of bolts extending through said plates and adapted to engage predetermined portions of said trunk cover for holding said plates inwardly of said latch mechanism, rigidly with respect to said latch mechanism and with one thereof lying substantially against said latch mechanism; a rotatable shaft extending between said plates and carrying a drum thereon; a projecting member extending co-axially from said shaft and being of such cross-section as to be receivable within said slot in non-rotatable relationship with respect to said barrel; a cable affixed to said drum and partially wrapped therearound; whereby rotative movement of said drum in response to a pulling force on said cable will effect rotation of said barrel which in turn will cause said latch mechanism to be released.

References Cited in the file of this patent

UNITED STATES PATENTS

| 1,492,180 | Pitrone | Apr. 29, 1924 |
| 1,722,621 | Bennett | July 30, 1929 |
| 2,202,834 | Clarkson-Jones | June 4, 1940 |
| 2,563,317 | Dix et al. | Aug. 7, 1951 |

FOREIGN PATENTS

| 169,792 | Great Britain | Oct. 3, 1921 |